United States Patent [19]
Forrester

[11] 4,411,335
[45] Oct. 25, 1983

[54] HUNTER'S TREE STAND

[76] Inventor: Joseph H. Forrester, 3635 Thompson Mill Rd., Buford, Ga. 30518

[21] Appl. No.: 247,942

[22] Filed: Mar. 26, 1981

[51] Int. Cl.³ .................. A01M 31/02; A45F 3/26; A47C 9/10; E06C 1/10
[52] U.S. Cl. ........................ 182/83; 182/93; 182/178; 182/187
[58] Field of Search .......... 182/187, 188, 92, 93, 182/100, 189, 178, 83; 108/152

[56] References Cited

U.S. PATENT DOCUMENTS

| | | | |
|---|---|---|---|
| 2,982,337 | 5/1961 | Arena | 182/187 |
| 3,368,725 | 2/1968 | Martin | 182/187 |
| 3,392,802 | 7/1968 | Moore | 182/187 |
| 3,493,080 | 2/1970 | Ehlert | 182/187 |
| 3,961,686 | 6/1976 | Starkey | 182/187 |
| 3,995,714 | 12/1976 | Brookes | 182/100 |
| 4,009,763 | 3/1977 | Hunter | 182/187 |
| 4,061,202 | 12/1977 | Campbell | 182/187 |
| 4,069,891 | 1/1978 | McClung | 182/187 |
| 4,263,983 | 4/1981 | Norton | 182/100 |

FOREIGN PATENT DOCUMENTS 102303 4/1899 Austria .................. 182/187

Primary Examiner—Reinaldo P. Machado
Attorney, Agent, or Firm—B. J. Powell

[57] ABSTRACT

A hunting stand and access ladder are disclosed for use by a hunter to support himself at an elevated position in a tree. The hunting stand includes a frame with a seat and foot support on it, an upper support means on the frame comprising a pair of prongs and a securing member eccentrically arranged so that the prongs are forced into the tree trunk as the frame is moved from an initial tilted position to a final position lying adjacent the tree trunk, and a lower securing means on the frame for holding the stand in the final position. The access ladder is sectional with each section including a central support tube, a cross member at the upper end of the support tube, a pair of support prongs on the cross tube, securing means to force the support prongs into the tree trunk to support the ladder section spaced from the tree trunk, and rungs on the support tube so that the hunter can climb the ladder section.

5 Claims, 5 Drawing Figures

FIG 4   FIG 5

HUNTER'S TREE STAND

BACKGROUND OF THE INVENTION

This invention relates generally to hunting stands and more particularly to tree mounted hunting stands with a tree mounted access ladder.

Hunters have for years used tree mounted stands for certain types of hunting such as deer hunting. Until recently, hunters typically built a stand at an elevated position in a tree and drove nails in the tree trunk to provide steps to gain access to the stand. More recently, forest management personnel have required that nails not be driven into the tree trunk since damage to tree harvesting and sawing equipment results.

This requirement has given rise to the widespread use of stands which are used by the hunter to climb the tree. Such stands are commonly called climbing stands. These climbing stands have a built-in gripping mechanism which permits the stand to grip the tree trunk at any position along its trunk. The hunter typically extends the gripping mechanism on the stand around the base of the tree trunk and attaches the stand to his feet. The hunter then grips the tree trunk and lifts the stand with his feet to a higher position and causes the gripping mechanism on the stand to regrip the tree trunk at the higher position. The hunter releases his initial grip on the tree trunk and regrips the tree trunk at a higher position. He continues to repeat this operation until he has reached the desired height in the tree. Some examples of climbing stands are shown in U.S. Pat. Nos. 3,955,645 (5/76) and 4,205,733 (6/80).

While the climbing type stand has the advantage of not using nails in the tree trunk and not requiring a separate ladder to get to the stand in the tree, such stands suffer from a number of disadvantages. One of the disadvantages is that such stands are prone to slip off the hunter's feet and automatically move down the tree trunk leaving the hunter stranded. Another disadvantage is that the hunter must work the stand up and down the tree trunk each time he wants to come down and go back up the tree. Another disadvantage is that the hunter must keep his weight properly positioned on the stand to keep the gripping mechanism engaging the tree trunk to keep the stand in place. Another disadvantage is that the hunter cannot raise the stand above the lowermost branch on the tree.

Another type of stand which has been tried is a fixed stand which can be fixedly mounted on the tree trunk. The stands typically require the use of a separate ladder so that the hunter can climb the tree on the ladder to install the stand and to mount the stand. Examples of the fixed type of stand are illustrated in U.S. Pat. Nos. 3,116,808 (3/62) and 3,961,686 (6/76).

While this type of stand permitted the hunter to come down and go back up the tree using the ladder, prior art stands of this type generally suffer from a number of disadvantages. Some of those stands required that the stand be assembled as it is installed in the tree thereby making installation difficult, especially when working off a ladder. Most of the ladders used with these stands did not permit the hunter to position himself so that his weight tended to move him toward rather than away from the tree so that he was stable, especially during the installation of the stand. Also, most of the ladders used with the stands were difficult to install, had a limited height to which they could be extended, and were subject to shifting on the tree trunk after they were installed. These prior art stands usually had limited stability so that the hunter had to be especially careful both during installation and use to insure safety of use.

SUMMARY OF THE INVENTION

The problems and disadvantages of the prior art are overcome by the invention disclosed herein by providing a hunting stand which can be easily transported and installed at any desired position along the tree trunk together with an access ladder that permits the hunter to safely ascend and descend the tree trunk to install and gain access to the stand. The hunting stand is provided with upper securing means which can be forced into supporting engagement with the tree trunk by pivoting the stand from an initial tilted position with the lower end of the stand spaced away from the tree trunk to a final installed position with the lower end of the stand adjacent the tree trunk. A lower securing means is provided on the stand to keep the lower end of the stand adjacent the tree trunk and the upper securing means in operative engagement with the tree trunk. The access ladder is assembled on the tree trunk from ladder sections, each of which is independently supported on the tree trunk from its upper end. The access ladder is spaced away from the tree trunk sufficiently to permit the hunter to safely ascend and descend the ladder.

These and other features and advantages of the invention are disclosed in the following description wherein like characters of reference designate corresponding parts throughout the several views and in which:

BRIEF DESCRIPTION OF THE DRAWINGS

FIG. 4 is a cross-sectional view taken along line 4—4 in FIG. 3; and

FIG. 5 is a perspective view of one of the ladder sections of the access ladder of the invention.

Figures 1, 2:
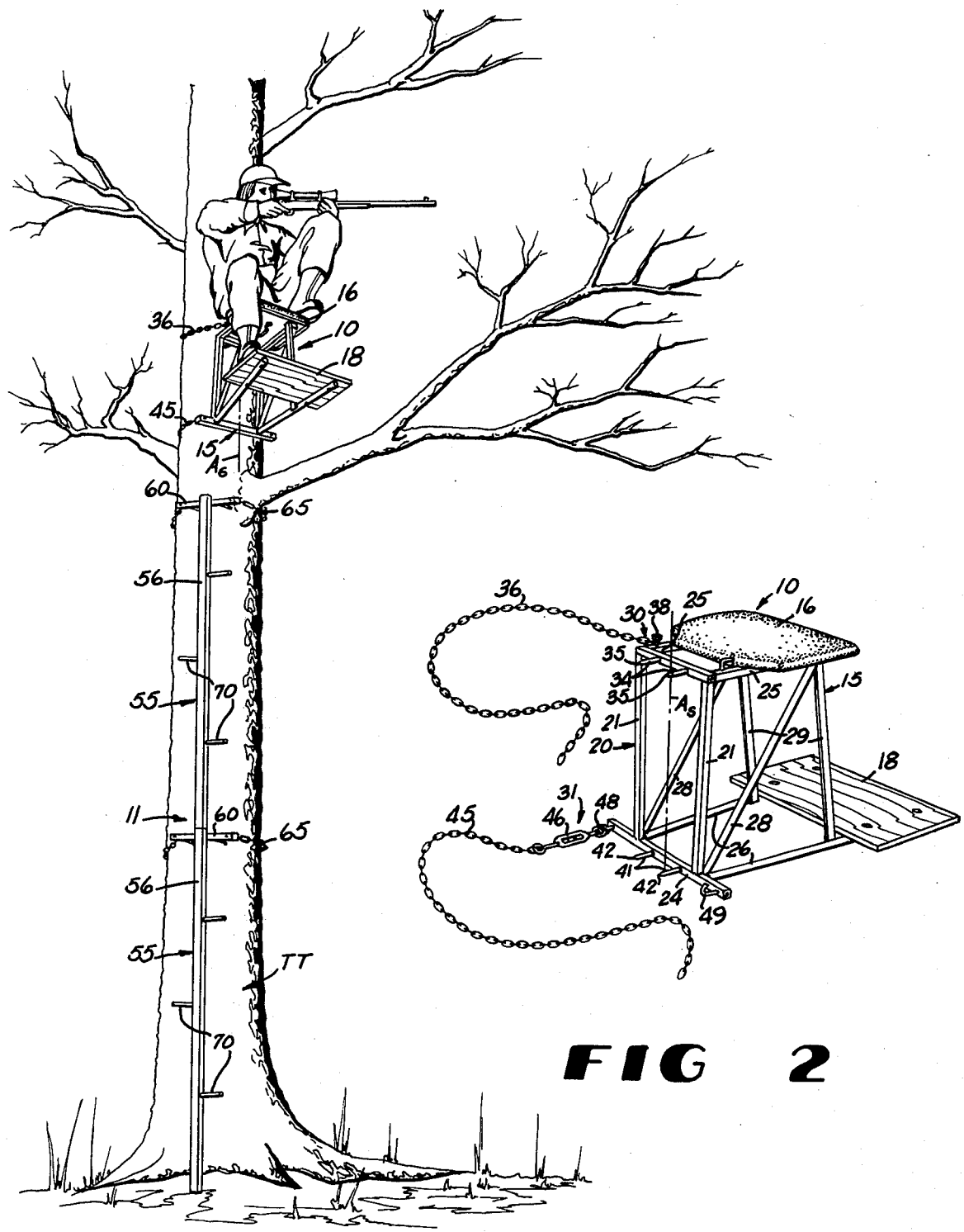
FIG. 1 is a view showing the invention in use.
FIG. 2 is a perspective view of the hunting stand of the invention.

These figures and the following detailed description disclose specific embodiments of the invention; however, the invention is not limited thereto since it may be embodied in other forms.

DETAILED DESCRIPTION OF ILLUSTRATIVE EMBODIMENTS

Referring to the drawings, it will be seen that the invention includes a hunting stand 10 and an access ladder 11 adapted to be mounted on a tree trunk TT. The access ladder 11 permits the hunter to install and use the stand 10. The hunter first installs the access ladder 11 to the tree trunk and then climbs the ladder with the stand 10 and installs it on the tree trunk. After this, the hunter may leave the ladder and stand in place for the duration of the hunt and gain access to the stand at his leisure for hunting.

Figure 3:
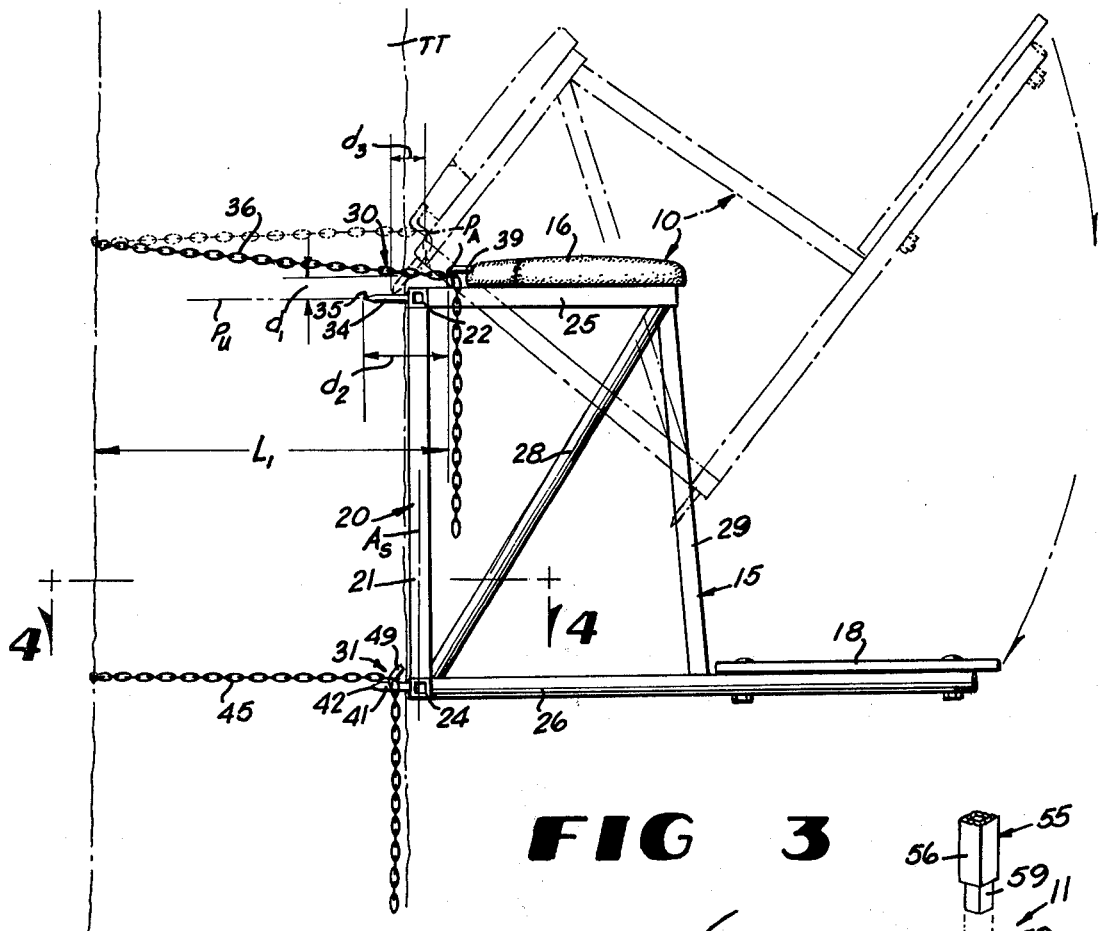
FIG. 3 is an enlarged side elevational view of the hunting stand of the invention illustrating the manner in which the hunting stand is installed.
Figure 3:
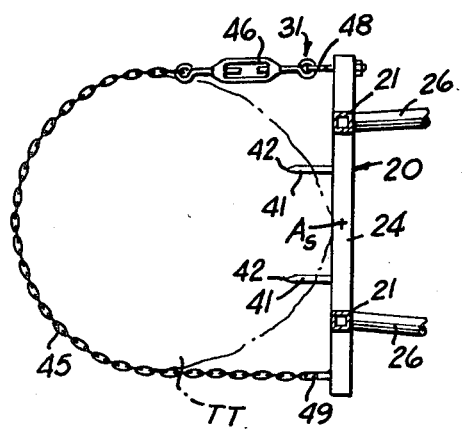
Figure 3:
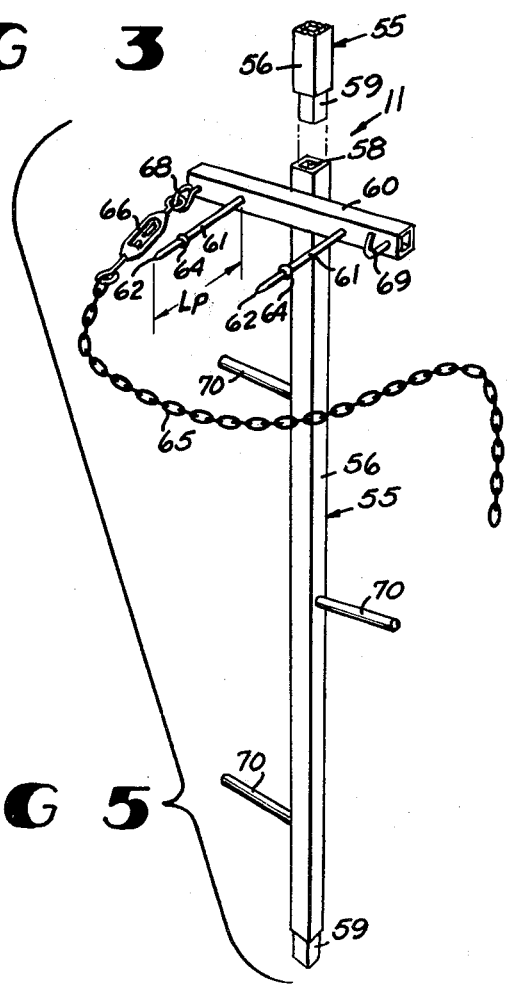

Referring more particularly to FIGS. 2-4, it will be seen that the hunting stand 10 includes generally an open frame 15 on which is mounted a seat 16 and a foot support 18. During use, the hunter may sit on the seat and rest his feet on foot support 18 or stand on the foot support 18 so that the hunter can quickly and easily position himself as necessary for firing at game.

The open frame 15 includes a back section 20 including a pair of spaced apart, generally vertical extending side members 21 joined at their upper ends by an upper cross member 22 and at their lower ends by a lower cross member 24. The lower cross member 24 has a length greater than that of the upper cross member 22 and is centered on the vertical central axis $A_S$ of the base section 20 so that opposite ends of the lower cross member 24 project out past the side members 21 as will become more apparent.

A pair of spaced apart upper side members 24 are attached at their rear ends to the upper cross member 22 at the vertical side members 21 and project forwardly from the cross member 22. The upper side members 25 are oriented normal to both the vertical axis $A_S$ and the upper cross member 22 so that the side members 25 lie in a common horizontal plane normal to axis $A_S$.

A pair of spaced apart lower side members 26 are attached at their rear ends to the lower cross member 24 at the vertical side members 21 and project forwardly from the cross member 24. The lower side members 26 are also oriented normal to both the vertical axis $A_S$ and the lower cross member 24 so that the lower side members 26 lie in a common horizontal plane normal to axis $A_S$. The lower side members 26 have a length greater than the length of the upper side members 25 so that the lower side members 26 project out from the back section further than the upper side members 25 as will become more apparent.

The forwardly projecting ends of the upper side members 25 are supported by a pair of brace members 28 which extend angularly upwardly from the junctures of the lower side members 26 and lower cross member 24 to the projecting ends of the side members 25. The projecting portions of the lower side members 26 are supported by a pair of straps 29 connected between the projecting ends of the upper side members 25 and the lower side members 26. The straps 29 are attached to the lower side members 26 at a position intermediate their lengths inboard of the projecting ends of the side members 26.

The seat 16 is attached to the top edges of the upper side members 25 and serves to maintain the upper side members 25 in their spaced apart position. The foot support 16 is attached to the top edges of those portions of the lower side members 26 projecting forwardly of the straps 29 and serves to maintain the lower side members 26 in their spaced apart postions.

Preferably the members 21, 22, 24-26 and 28 are tubular and the frame 15 is made of a material having a high strength to weight ratio to minimize the weight thereof. Further, the components of the frame 15 are preferably attached together by welding to prevent any movement between components at the attachment points to prevent squeaking as the hunter moves about on the stand 10 to position himself for firing.

The seat 16 is preferably padded for comfort while the hunter is seated thereon. The foot support 18 is large enough to permit the hunter to stand and turn thereon so that he can easily position himself in different firing stances. The foot support 18 shown has dimensions of about 13 by 21 inches and has been found satisfactory.

The stand 10 is secured to the tree trunk with an upper securing means 30 and a lower securing means 31 mounted on frame 15. The upper securing means 30 is used to initially secure the stand 10 to the tree trunk while the lower securing means 31 is used to keep the upper securing means in operative association with the tree trunk as will become more apparent.

The upper securing means 30 includes a pair of spaced apart tree penetrating support prongs 34 attached to the upper cross member 22 and projecting outwardly therefrom in a direction opposite to that in which the upper side members 24 project. The support prongs 34 are oriented so that their central axes are normal to the stand axis $A_S$ and lie in a common plane $P_U$ normal to axis $A_S$. The support prongs 34 are positioned equidistant from and on opposite sides of the stand axis $A_S$ so that when the prongs 34 penetrate the tree trunk, the prongs 34 will support the stand both axially along and circumferentially about the tree trunk. The prongs 34 have a length such that they penetrate the tree trunk sufficiently to hold the stand in position and the projecting ends thereof are pointed as indicated at 35 to facilitate the penetration of the tree trunk. A length of about two inches has been found sufficient for prongs 34.

The upper securing means 30 also includes a flexible securing member 36, illustrated as a chain, adapted to extend around the tree trunk and be connected to the top of stand frame 15 at its opposite ends. Typically, one end of the chain 36 is affixed to the frame 15 by an appropriate attachment means such as the bolt 38 while the opposite end is adjustably and removably connected to the frame by a hook 39. Thus, it will be seen that the free end of chain 36 can be passed around the tree trunk and hooked onto the hook 39 for mounting the stand as will become more apparent. The bolt 38 and hook 39 are located on the frame 15 so that pivoting the frame 15 from the initial tilted position shown by phantom lines in FIG. 3 to the final installed position shown by solid lines in FIG. 3 forces the prongs 34 to penetrate the tree trunk as will become more apparent.

The points at which the chain 36 is connected to frame 15 on bolt 38 and hook 49 are spaced above the plane $P_U$ of the prongs 34 the distance $d_1$ and are each spaced forwardly of the prong tips 35 the distance $d_2$ as seen in FIG. 3. To install the stand 10, the hunter holds the stand in the initial tilted position with the stand axis $A_S$ at an angle of about 45° with respect to the tree trunk centerline and sets the points 35 of prongs 34 against the tree trunk. The hunter then loops the free end of the chain 36 around the tree trunk and pulls it taut with the chain generally horizontally located. The hunter then selects a link in the chain 36 and hooks it onto the hook 39 so that the chain is substantially taut. The hunter can then release the stand 10 and the weight of the stand tries to pivot it down about the points 35 of the prongs 34. The chain 36, however, limits the movement of the frame 15 away from the tree trunk so that the points 35 on prongs 34 start penetrating the tree trunk. The hunter forces the stand 10 downwardly to pivot the stand to the final position with the back section 20 lying along the tree trunk to cause the prongs 34 to penetrate the tree trunk to a sufficient depth to support the stand 10 as will become more apparent.

When the stand 10 is in its initial tilted position shown by phantom lines in FIG. 3, the points 35 of prongs 34 are located the effective horizontal distance $d_3$ from the points of attachment $P_A$ of the chain 36 to frame 15. As the frame 15 is forced down from the initial tilted position to the installed position shown by solid lines in FIG. 3, the chain 36 forces the points of attachment $P_A$ to swing about an arc centered on the chain 36 at the opposite side of the tree trunk from frame 15 and with a radial length $L_1$ fixed by the chain 36. Because the points 35 of prongs 34 remain axially fixed along the length of the tree trunk as the frame 15 is pivoted, the effective horizontal distance between the points of attachment $P_A$ and the points 35 of prongs 34 have increased from distance $d_3$ to distance $d_2$ while the distance between the points of attachment $P_C$ between the prongs 34 and the tree trunk remains about the same. The net effect of this action is to force the points 35 on prongs 34 into the tree trunk for a distance substantially equal to the difference between distances $d_3$ and $d_2$. The depth to which the prongs 34 penetrate the tree trunk is limited by the cross member 22 engaging the tree trunk.

The lower securing means 31 includes a pair of spaced apart, tree penetrating holding prongs 41 attached to the lower cross member 24 and projecting outwardly therefrom in the same direction as the upper support prongs 34. The holding prongs 41 are also oriented so that their central axes are normal to the stand axis $A_S$ and lie in a common plane normal to axis $A_S$. Like the upper support prongs 34, the lower holding prongs 41 are positioned equidistant from and on opposite sides of the stand axis $A_S$ so that when the prongs 41 penetrate the tree trunk, they assist the upper support prongs 34 in supporting the stand 10 axially along and circumferentially about the tree trunk. The prongs 41 also have a sufficient length to penetrate the tree trunk and the projecting ends thereof are pointed as indicated at 42 to facilitate the penetration of the tree trunk. A prong length of about two inches has been found satisfactory.

When the stand 10 has been forced down to force the upper support prongs 34 into penetrating engagement with the tree trunk, the lower cross member 24 is moved toward the tree trunk to place the points 42 on holding prongs 41 in contact with the tree trunk. Typically, the hunter then steps onto the foot support 18 so that his weight forces the points 42 on holding prongs 41 to penetrate the tree trunk.

The lower securing means 31 also includes a flexible, elongate securing member 45 illustrated as a chain adapted to extend around the tree trunk and be connected to the lower cross member 24. One end of the chain 45 is connected to a length adjustment mechanism 46 illustrated as a turnbuckle. The opposite end of turnbuckle 46 is connected to one of the projecting ends of the lower cross member 24 by an appropriate attachment device 48 shown as an eyebolt. The opposite end of chain 45 is adjustably and removably connected to the opposite end of the lower cross member 24 through hook 49.

While the hunter stands on the foot support 18 to force the lower holding prongs 41 into the tree trunk, he passes the free end of the chain 45 around the tree trunk and hooks the chain onto the hook 49 so that the chain is taut. The hunter then manipulates the turnbuckle 46 to effectively shorten the length of chain 45 and force the holding prongs 41 into further penetration of the tree trunk and hold the prongs 41 in the tree trunk. The depth of penetration of prongs 41 is limited by the cross member 24 engaging the tree trunk. The stand 10 is now installed and ready for use.

The access ladder 11 seen in FIGS. 1 and 5 is made in ladder sections 55 which have a common construction and which can be fitted together to make the access ladder 11 of any desired height. The sections 55 can be separated to permit easy portability to the desired tree yet form a rigid structure when assembled on the tree trunk for easy access and safety in use.

Each ladder section 55 includes a central elongate support tube 56 adapted to be generally vertically oriented when the ladder section is mounted on the tree trunk. The upper end of the support tube 56 is left open to define a support passage 58 therein and the lower end of the support tube 56 is provided with a support projection 59 sized to slidably fit into the support passage 58 so that the projection 59 can be fitted in the support passage 58 of another of the ladder sections 55 whereby the support tubes 56 can be interconnected in an end-to-end fashion.

A cross tube 60 is attached to the support tube 56 and extends generally normal thereto. The cross tube 60 is positioned so that it projects equally outward on opposite sides of the support tube and serves as the top step on the ladder section 55 as will become more apparent.

A pair of support prongs 61 are mounted on the cross tube 60 and project outwardly from that side of the cross tube 60. The projecting ends of prongs 61 are pointed as indicated at 62 so that the prongs 61 will penetrate the tree trunk and have a length $L_P$ such that the support tube 56 will be spaced away from the tree trunk when the prongs 61 have penetrated the tree trunk sufficiently to support the ladder section 55. The prongs 61 may be provided with abutments 64 spaced inwardly of their points 62 to limit the penetration of the tree trunk. Typically, a length $L_P$ is selected for the prongs 61 so that the support tube 56 will be spaced 5-10 inches from the tree trunk. It will also be noted that the prongs 61 are positioned equidistance from and on opposite sides of the support tube 56 so that the ladder section 55 will be supported both axially of and circumferentially about the tree trunk.

The cross tube 60 has a length greater than the distance between the support prongs 61 so that opposite ends of the tube 60 project out beyond the prongs 61. A flexible elongate securing member 65 shown as a link chain is provided for holding the prongs 61 in a tree penetrating position. One end of the chain 65 is connected to a length adjustment mechanism 66 shown as a turnbuckle whose opposite end is in turn connected to one end of the projecting ends of the cross tube 60 by an appropriate attachment device 68 shown as an eyebolt. The opposite end of the chain 65 is adjustably and removably connected to the opposite projecting end of the cross tube 60 by a hook 69. With the points 62 on the prongs 61 held against the tree trunk while the support tube 56 is oriented generally parallel to the longitudinal centerline of the tree trunk, the hunter passes the free end of the chain 65 around the tree trunk and hooks the chain on hook 69 so that the chain is taut. The hunter then manipulates the turnbuckle 66 to effectively shorten the length of the chain 65 and force the points 62 on prongs 61 into the tree trunk for a sufficient depth to support the ladder section 55 as will become more apparent.

A plurality of rung tubes 70 are attached to the support tube 56 at vertically spaced apart positions between the cross tube 60 and the lower end of the tube 56. The rung tubes 70 are oriented so that they alternately extend outwardly in opposite directions from the support tube 56 and project outwardly from the support tube 56 in the same general direction as the cross tube 60 so that the hunter can step from rung tube to rung tube as he climbs the ladder section and use the cross tube 60 as the uppermost step on the ladder section. The rung tubes 70 angle slightly upwardly as they project from the support tube 56 so that the hunter's feet are urged toward the support tube 56 to prevent his feet from slipping off the rung tubes 70 as he climbs the ladder section.

The hunter assembles the access ladder 11 by taking one of the ladder sections 55 and placing the section so that the support tube 56 is oriented generally parallel to the centerline of the tree trunk with the lower end of the support tube 56 placed on the ground adjacent to but spaced away from the tree trunk. He then places points 62 of prongs 61 against the tree trunk. The height of the ladder section 55 is such that the hunter can reach the chain 65 while standing on the ground to pass it around the tree trunk to hook it on hook 69 and then manipulate the turnbuckle 68 to force the prongs 61 into the tree trunk. While different heights may be used for the sections 55, a height of about five feet has been found satisfactory.

While still standing on the ground, the hunter then places the next ladder section 55 on top of the already installed section 55 so that the projection 59 on this next ladder section slides into the support passage 58 in the already installed ladder section. This keeps the support tube 56 on the next ladder section 55 coaxial with the tube 56 on the already installed ladder section. The hunter then climbs the already installed ladder section 55 until he is standing on the cross tube 70 of the already installed ladder section. This allows him to reach the chain 65 on the next ladder section to hook and tighten it to force the the prongs 61 into the tree trunk to support the next ladder section 55.

The hunter can repeat this process to keep adding ladder sections 55 until the desired height of the access ladder 11 is achieved. Because the ladder 11 can be installed in any space along the tree trunk through which the support tube 56 can be extended, the ladder can be easily extended past tree branches to permit the hunter to gain access above the lower branches in trees. This permits the hunter to install the stand 10 above these lower branches as seen in FIG. 1 to better screen himself from the game so that he can move on the stand 10 with less likelihood of frightening the game.

It will be seen that each of the ladder sections 55 is independently supported on the tree trunk by the prongs 61. This insures maximum stability of the ladder 11 since the load does not have to be transferred through the connections between the support tubes 56 on the different ladder sections. Further, it will be noted that each ladder section 55 is supported at its upper end. This helps keep the lower end of each ladder section stable and saves having to rely on the ground supporting any of the load on the ladder 11.

After the ladder 11 is installed, the hunter carries the stand 10 as he climbs the ladder and installs the stand 10 as described hereinbefore while standing on the upper end of the ladder. The fact that the ladder 11 is spaced away from the tree trunk permits the hunter to lean his body toward the tree sufficiently to easily balance himself for climbing the ladder and installing the stand 10.

What is claimed as invention is:

1. A hunting stand for supporting a hunter on a tree trunk comprising:

a frame having a stand axis, an upper end and a lower end, said frame including a pair of spaced apart back side members vertically oriented generally parallel to the stand axis; an upper cross member fixedly connecting the upper ends of said back side members and oriented generally normal to the stand axis; a lower cross member fixedly connecting the lower ends of said back side members and oriented generally normal to the stand axis; a pair of upper seat side members fixedly connected at one end to said upper cross member and projecting horizontally away from said upper cross member generally normal to said stand axis and said upper cross member; a pair of lower foot side members longer than said upper seat side members fixedly connected at one end to said lower cross member and projecting horizontally away from said lower cross member under said upper seat side members generally normal to said stand axis and said lower cross member; a pair of angular brace members fixedly connecting said back side members with said upper seat side members; and a pair of generally vertically extending strap members fixedly connecting the projecting end of each of said upper seat side members with each of said lower foot side members intermediate their ends;

a hunter support seat affixed to said pair of upper seat side members adjacent the projecting ends thereof to maintain the upper seat side members in the spaced apart position;

a planar hunter foot support affixed to said lower foot side members between said strap members and the projecting ends of said lower foot side members to maintain said lower foot side members in the spaced apart position;

a pair of tree penetrating support prongs affixed to said said upper cross member and projecting outwardly therefrom oppositely to said upper seat side members and generally normal to but equidistant from and on opposite sides of the stand axis to engage the tree trunk;

a non-elastic elongate flexible securing member adjustably connected to said frame eccentrically of said support prongs while said securing member extends around the tree trunk to cause said support prongs to penetrate the tree trunk to fixedly yet removably locate said frame both longitudinally of and circumferentially about the tree trunk as the frame is pivoted from an initial tilted position in which the lower end of said frame opposite said support prongs is spaced away from the tree trunk to a final position in which the lower end of said frame opposite said support prongs lies adjacent the tree trunk so that the weight of the hunter on said foot support forces said frame from said initial position toward said final position;

a pair of tree penetrating holding prongs affixed to said lower cross member equidistant from and on opposite sides of said stand axis and projecting from said cross member normal to said stand axis and in the same direction as said support prongs to engage the tree trunk when said frame is pivoted to its final position;

a non-elastic elongate, flexible holding member including length adjustment means adjustably connected to opposite ends of lower cross member for extension around the tree trunk so that said length adjustment means can be manipulated while the hunter is on said foot support to effectively shorten the length of said holding member and maintain said frame in said final position with said holding prongs in penetrating engagement with the tree trunk.

2. The hunting stand of claim 1 further including, in combination therewith, an access ladder for use by the hunter in climbing the tree trunk to install and use said stand at an elevated position on the tree trunk, said access ladder comprising a plurality of ladder sections which fit together in an end-to-end fashion to form the ladder, each of said ladder sections including:

an elongate central support member adapted to extend generally vertically along the tree trunk and having upper and lower ends;

interconnecting means for selectively interconnecting the lower end of said support member of one of said ladder sections with the upper end of said support member of another of said ladder sections so that said ladder sections can be interconnected in an end-to-end fashion;

a cross member attached to said support member adjacent the upper end thereof and projecting outwardly from opposite sides of said support member generally normal thereto;

a pair of spaced apart support prongs mounted on said cross member and projecting outwardly therefrom equidistant from and on opposite sides of said support member normal to said cross member and said support member to penetrate the tree trunk to fixedly yet removably support said ladder section both longitudinally of and circumferentially about the tree trunk; and elongate securing means adjustably connected to said cross member and adapted to extend around the tree trunk, said securing means including length adjustment means adapted to be manipulated to effectively shorten the length of said securing means to force said prongs into penetrating engagement with the tree trunk so that each said ladder section is vertically supported on the tree trunk by said prongs independently of the other of said ladder sections.

3. An access ladder for use by a hunter in climbing a tree trunk and comprising a plurality of ladder sections which fit together in an end-to-end fashion to form the ladder, each of said ladder sections including:

an elongate central support member adapted to extend generally vertically along the tree trunk and having upper and lower ends;

interconnecting means for selectively interconnecting the lower end of said support member of one of said ladder sections with the upper end of said support member of another of said ladder sections so that said ladder sections can be interconnected in an end-to-end fashion;

a cross member attached to said support member adjacent the upper end thereof and projecting outwardly from opposite sides of said support member generally normal thereto;

a pair of spaced apart support prongs mounted on said cross member and projecting outwardly therefrom equidistant from and on opposite sides of said support member normal to said cross member and said support member to penetrate the tree trunk to fixedly yet removably support said ladder section both longitudinally of and circumferentially about the tree trunk, each of said support prongs including an abutment thereon intermediate the ends of said support prong and spaced a prescribed distance out from said cross member to limit the penetration of said support prong into the tree trunk;

elongate securing means adjustably connected to said cross member and adapted to extend around the tree trunk, said securing means including length adjustment means adapted to be manipulated to effectively shorten the length of said securing means to force said prongs into penetrating engagement with the tree trunk until said abutments engage the tree trunk so that said prongs support said ladder section at its upper end vertically along the tree trunk with the upper end of said central support member spaced away from the tree trunk and so that another of said ladder sections can be connected to the upper end of said central support member by said interconnecting means and attached to the tree trunk by said prongs and said securing means of the last mentioned ladder section whereby each of said ladder sections is vertically supported on the tree trunk independently of the other of said ladder sections.

4. The access ladder of claim 3 wherein each of said ladder sections further includes a plurality of rung members mounted on and projecting outwardly from said support member at axially spaced apart positions so that the hunter can climb said ladder section on said rung members.

5. An access ladder as set forth in claim 3 further including, in combination therewith, a hunting stand for supporting the hunter at an elevated position on the tree trunk comprising:

a frame having a stand axis and opposed ends;

hunter support means on said frame;

a pair of tree penetrating support prongs affixed to said frame adjacent one end thereof and projecting outwardly from said frame generally normal to the stand axis to engage the tree trunk; and a non-elastic elongate flexible securing member adjustably connected to said frame eccentrically of said support prongs while said securing member extends around the tree trunk to cause said support prongs to penetrate the tree trunk to fixedly yet removably locate said frame both longitudinally of and circumferentially about the tree trunk as the frame is pivoted from an initial tilted position in which that end of said frame opposite said support prongs is spaced away from the tree trunk to a final position in which that end of said frame opposite said support prongs lies adjacent the tree trunk.

* * * * *